Dec. 14, 1971  G. H. CARDIFF  3,626,668
ELECTRONIC AIR FILTER MEANS
Filed May 19, 1969  5 Sheets-Sheet 1

INVENTOR.
GEORGE H. CARDIFF
BY
John H. Wildnum
ATTORNEY

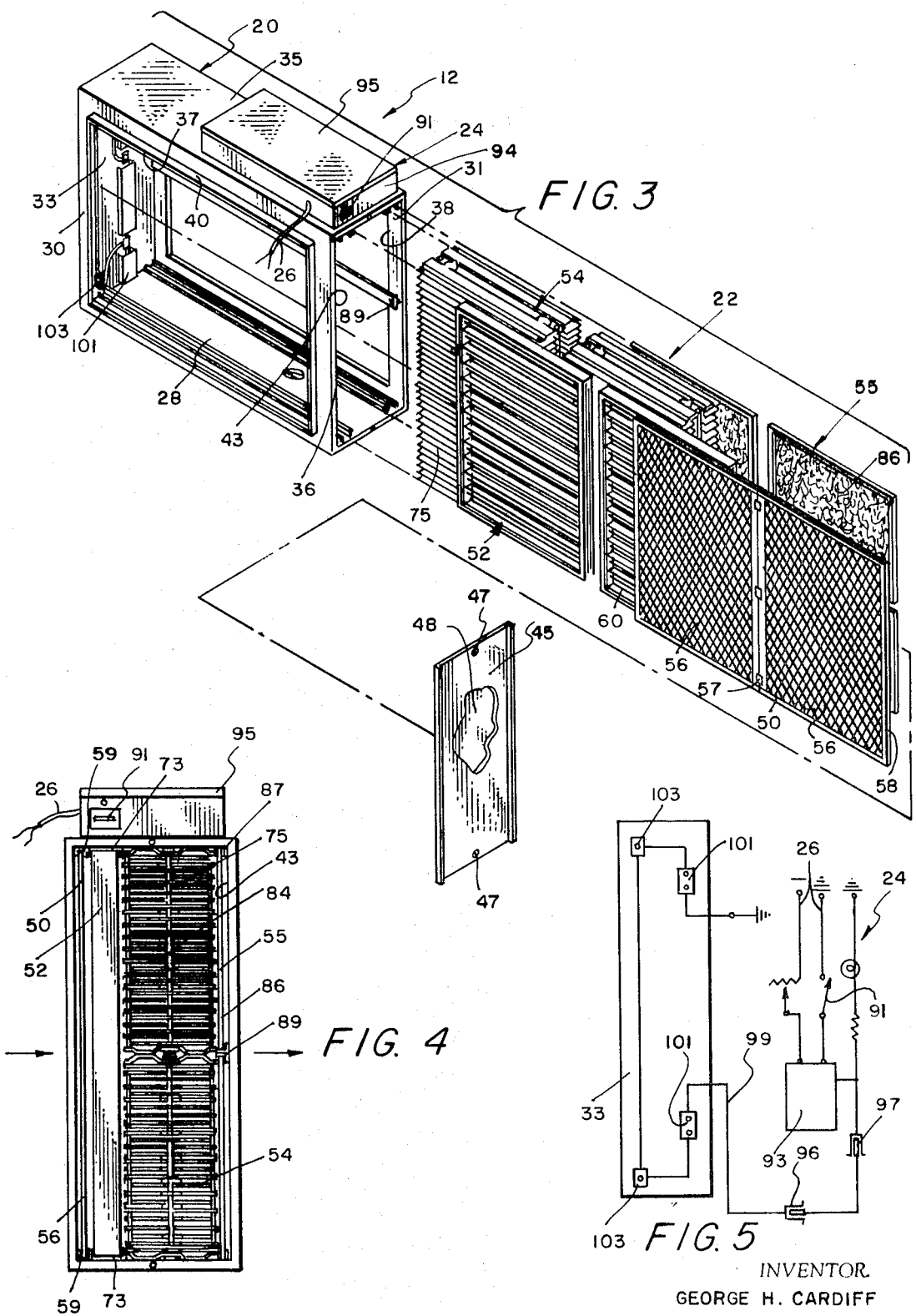

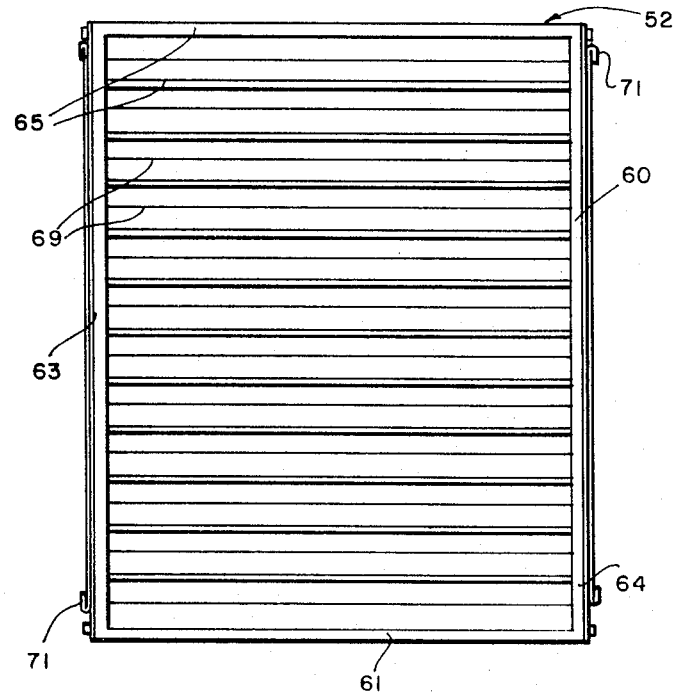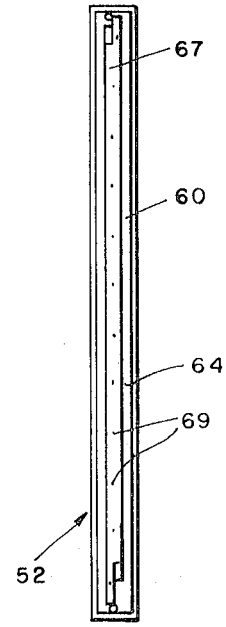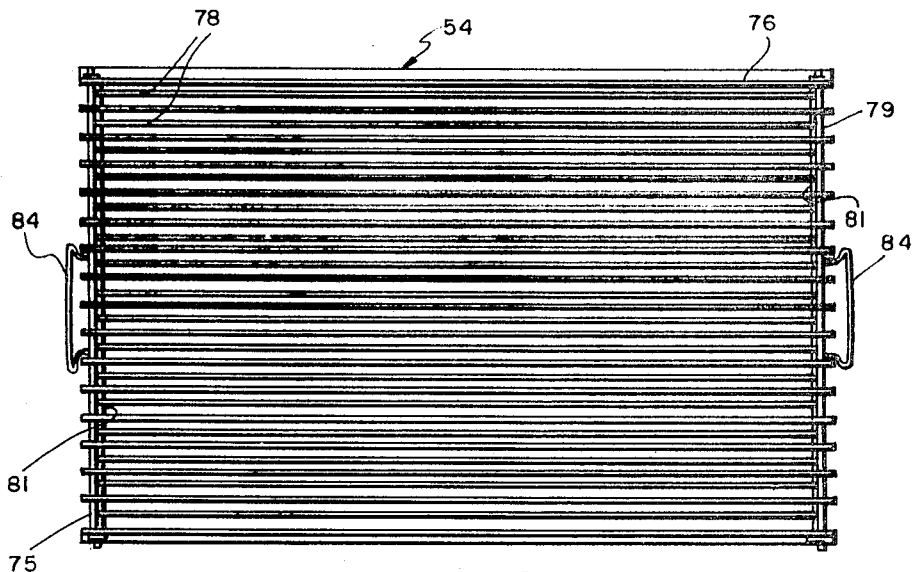
FIG. 6  FIG. 7
FIG. 8
INVENTOR.
GEORGE H. CARDIFF
BY John H. Widdowson
ATTORNEY

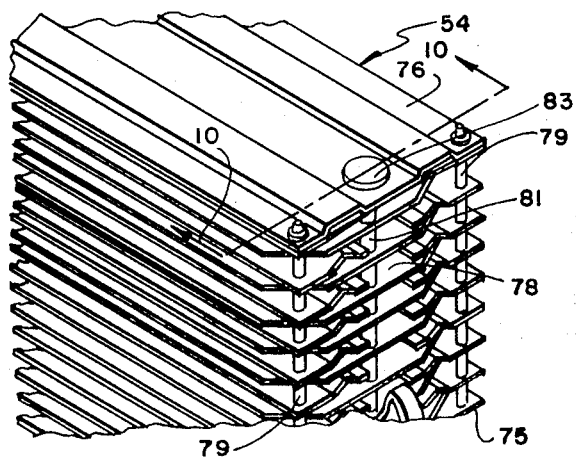
FIG. 9
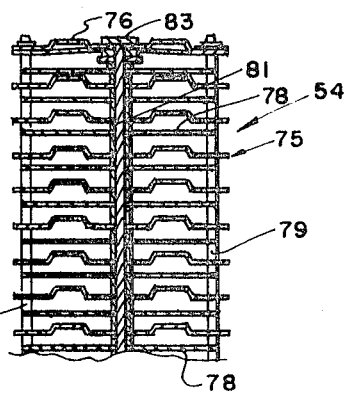
FIG. 10
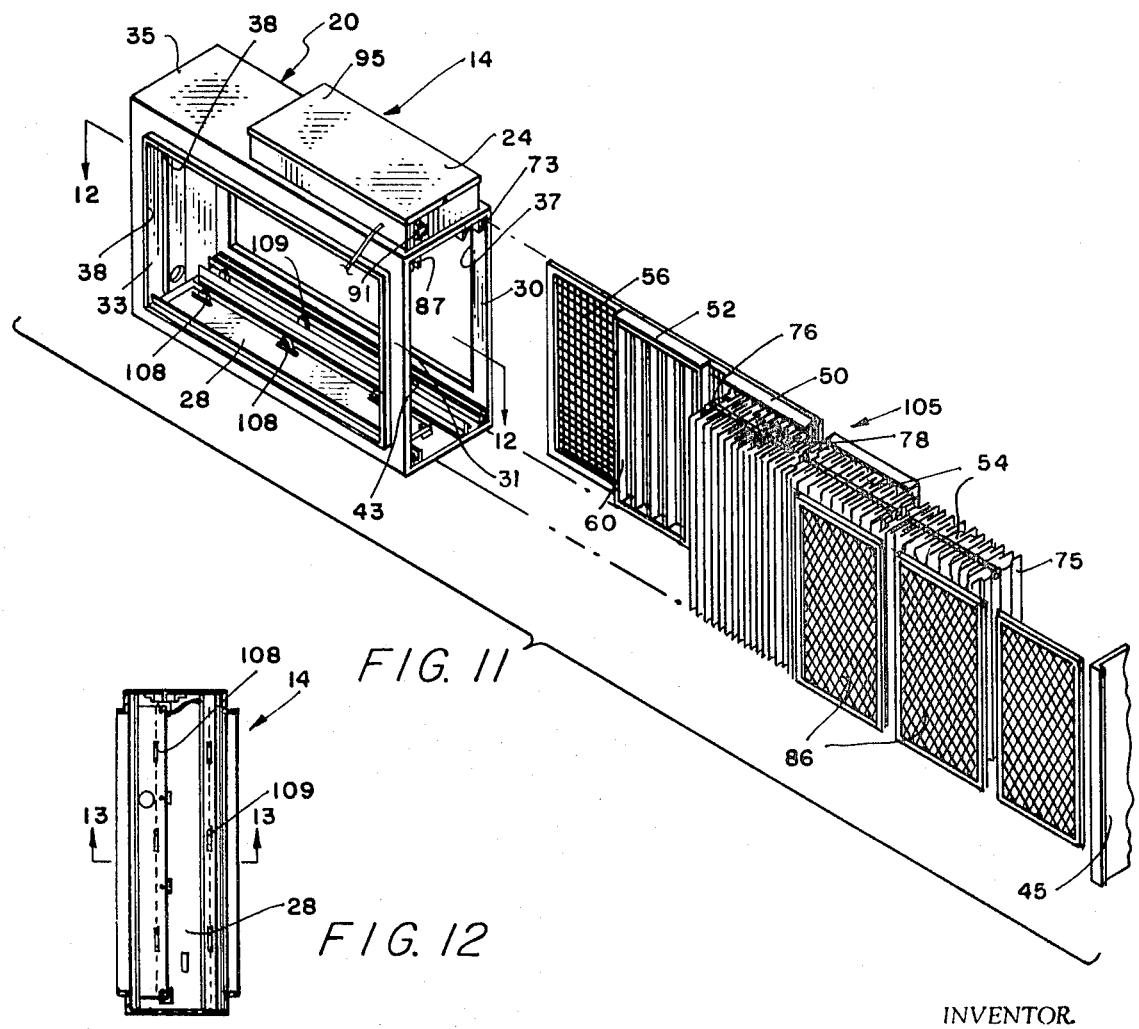
FIG. 11
FIG. 12
INVENTOR.
GEORGE H. CARDIFF
BY
*John H. Widdowson*
ATTORNEY Dec. 14, 1971          G. H. CARDIFF          3,626,668
ELECTRONIC AIR FILTER MEANS
Filed May 19, 1969                       5 Sheets-Sheet 5
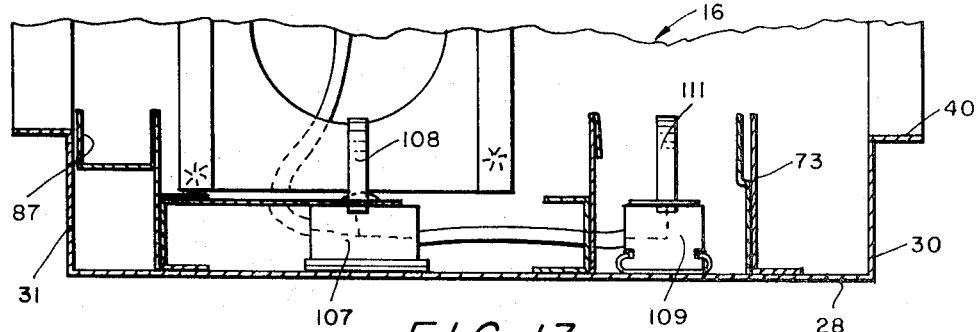
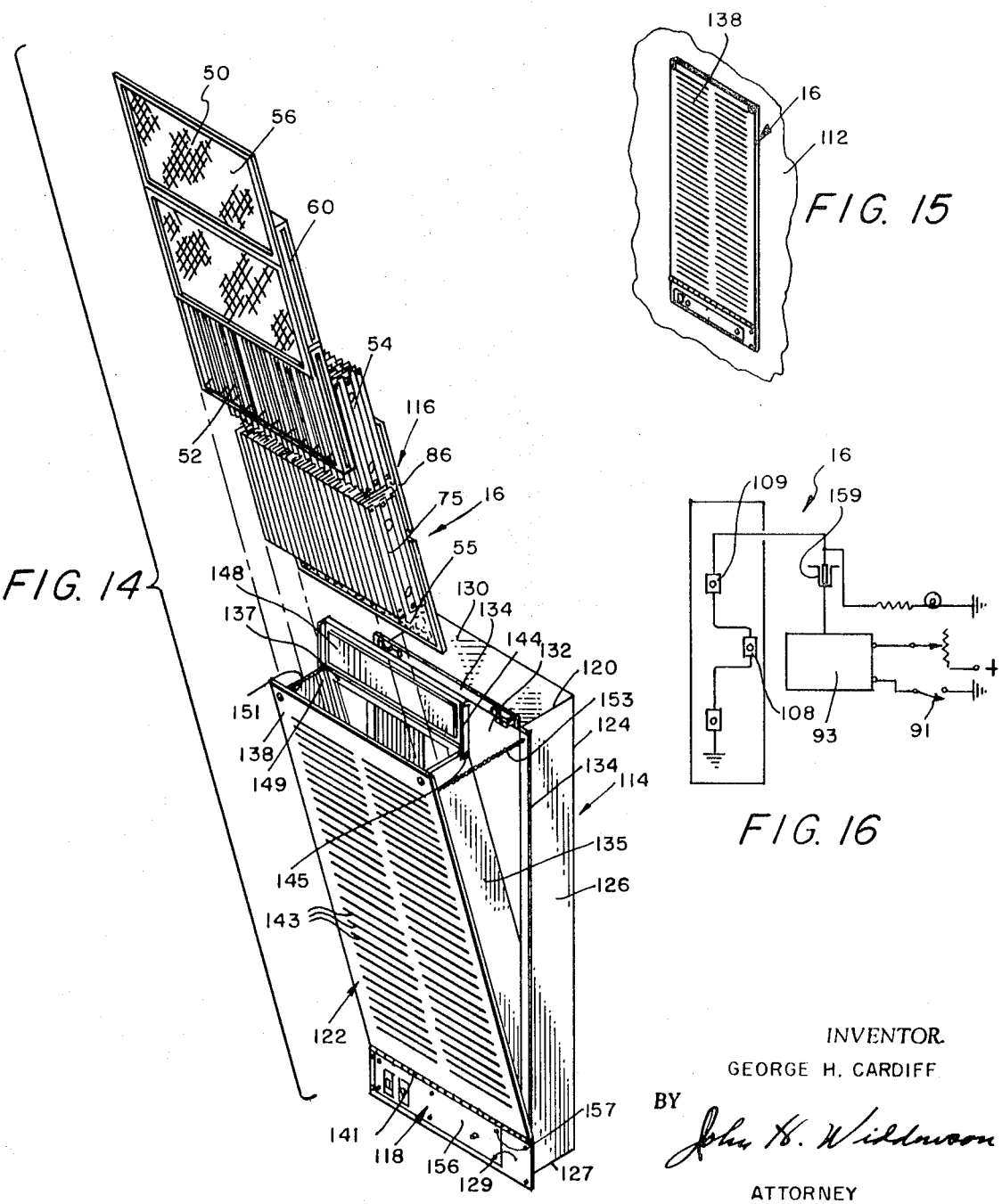
INVENTOR.
GEORGE H. CARDIFF
BY
John H. Wilkinson
ATTORNEY

United States Patent Office 3,626,668
Patented Dec. 14, 1971

3,626,668
ELECTRONIC AIR FILTER MEANS
George H. Cardiff, P.O. Box 1138,
Wichita, Kans. 67201
Filed May 19, 1969, Ser. No. 825,732
Int. Cl. B03c 3/01
U.S. Cl. 55—126                         3 Claims

ABSTRACT OF THE DISCLOSURE

An electronic air filter means including duct mounted air filter structures and wall mounted air filter structures, each adapted to receive air flow through a pre-filter assembly; a plurality of ionizer assemblies; particle collector means; after-filter agglomerator assembly; and utilizing control means to provide power for the proper charging of foreign particles within the air for removing the same on passage therethrough. More particularly, disclosed is an air filtering means having modular electrostatic precipitator means operable to separate foreign particles from a given air flow therethrough, the precipitator means having ionizer units and particle collector units readily removable for service and maintenance with a minimum amount of time and effort required.

---

It is well known in the prior art to utilize electrostatic air filters having ionizing units to electrically charge foreign particles in the air plus collecting units oppositely charged with a high voltage to attract the particles in air flow therethrough resulting in an efficient filtering action. However, the prior art structures are generally limited in the filtering capacity and compactness and not readily operable for high flow rates to filter out smoke, tar, nicotines, dust particles, and the like. Also, the prior art structures are generally bulky in size and, therefore, are not readily adapted for installation in compact places such as found in existing furnace installations and cannot be placed in the existing air return duct. After a period of time, the filtering of air results in the collection of tars, resins, oils, and nicotine on the collector plate units and such foreign material is difficult to remove because of the closeness of the plates and the type of material. Therefore, it is desirable to provide a structure wherein the collector plates are readily removable for cleansing thereof. In the prior art air filter structures, the collector plates can only be cleansed by steam or the like while in the assembled condition which is hard on the equipment plus being expensive.

In one preferred embodiment of this invention, an improved electronic air filter means is provided including various embodiments being (1) a duct mount air filter structure; (2) a duct mount compact air filter structure; and (3) a wall mount air filter structure. The duct mount air filter structure includes a main, generally rectangular housing means having an electrostatic precipitator means mounted therein and a control means mounted on the housing means operably connected to a power supply source to charge the electrostatic precipitator means. The housing means is of a rectangular shape having opposed sides provided with an enlarged air opening and an air discharge opening, respectively, whereupon these openings are designed to be substantially the size of a given air return duct in a furnace system so as to achieve a cleansing action of the air moving through the duct. The electrostatic precipitator means includes a pre-filter assembly; ionizer assemblies; particle collector means; and after-filter agglomerator assembly. The pre-filter assembly includes a pair of interconnected panel members constructed of a small screen mesh so as to be readily washed without damage and operable in usage to connect lint particles thereon. Each ionizer assembly is provided with a housing structure having a plurality of generally parallel tungston wire members thereacross adapted to achieve an intense positive electrical charge on the particles within the air flow moving therepast. The particle collector means includes a plurality of collector cells or units, each having a plurality of parallel plate members aternately charged positively and negatively and constructed so as to be readily removed from the housing means. The after-filter agglomeration assembly includes a pair of rectangular filter structures adapted to catch particles that may break loose from the particle collector cells during usage. The electrostatic precipitator means is readily mountable within various guide tracks within the housing means so that the elements can be readily removed for cleansing and maintenance. The control means includes a main control panel mounted on the upper surface of the housing means and operably connected through various conductors and switch members to energize the ionizer assemblies and the particle collector cells when in the assembled condition to achieve the filtering action of this invention.

In another embodiment, the duct mount compact air filtering structure includes a similar housing means; electrostatic precipitator means mounted within the housing means; and a control means to control the operation thereof. However, in this embodiment, the electrostatic precipitator means includes various components of the pre-filter assembly; the ionizer assemblies; the particle collector means; and the after-filter agglomeration assembly so that the same is mountable within the housing means in a different manner so as to be connected within the duct system of a furnace system to achieve the new and novel function of this invention.

In one further embodiment of this invention, the wall mount air filter structure is adapted to be mounted within an air return duct such as flush against a wall surface. The wall mount air filter structure includes a main housing means; electrostatic precipitator means mounted within the housing means; and a control means mounted in a lower portion of the housing means readily removable therefrom for repair and maintenance. The housing means includes an upright rectangular container structure having an upright entrance or access door assembly having its lower end pivotally connected to a front wall so that the upper end is movable outwardly for access to the electrostatic precipitator means for removing the same for maintenance and repair. The electrostatic precipitator means includes a pre-filter assembly; an ionizer assembly; particle collector means; an after-filter agglomeration assembly, all substantially similar to the previously described embodiments. The wall mount air filter structure is readily mountable in a given wall area and connected to the air return duct. The wall mount air filter structure is extremely desirable in many installations where a basement area is not present or space requirements are very limited.

One object of this invention is to provide a new and novel electronic air filter means overcoming the aforementioned disadvantages of the prior art devices.

Another object of this invention is to provide a compact electronic air filter means which is readily mountable within the return air duct in conventional furnace systems taking up a minimum amount of space and providing easy access means for the maintenance and periodic cleansing of the same.

One further object of this invention is to provide a duct mount air filter structure readily mounted in various sizes of return air ducts and uses the minimum amount of space but achieves the utmost in efficient operation.

Still, one further object of this invention is to provide a wall mount air filter structure mountable flush with a wall structure having an access door assembly readily movable from closed to open conditions so that the various elements of an electrostatic precipitator means therein can be readily removed for repair and maintenance.

Still, another object of this invention is to provide an electronic air filter means that is compact in size; economical to manufacture; inexpensive to operate; provides the utmost in safety during usage; and provides highly efficient and effective filtering action.

One other object of this invention is to provide an electronic air filter means which is readily mountable within air return duct systems operable with a high voltage, low amperage electrical supply so as to be safe and economical for household operations.

Various other objects, advantages, and features of the invention will become apparent to those skilled in the art from the following discussion, taken in conjunction with the accompanying drawings, in which:

FIG. 3 is an exploded perspective view of the embodiment of FIG. 2;

FIG. 4 is a side elevational view of the duct mount air filter structure of this invention having an access plate removed for clarity;

FIG. 5 is an electrical schematic diagram of the control means of the duct mount air filter structure of this invention;

FIG. 6 is a front elevational view of an ionizer assembly of the air filter means of this invention;

FIG. 7 is a side elevational view of the ionizer assembly shown in FIG. 6;

FIG. 8 is an elevational view of a particle collector unit of the air filter means of this invention;

FIG. 9 is a fragmentary perspective view of the particle collector unit of the air filter means of this invention;

FIG. 10 is a fragmentary sectional view taken along line 10—10 in FIG. 9;

FIG. 11 is an exploded perspective view similar to FIG. 3 of a duct mount compact air filter structure embodiment of the air filter means of this invention;

FIG. 12 is a sectional view taken along line 12—12 in FIG. 11;

FIG. 13 is an enlarged fragmentary sectional view taken along line 13—13 in FIG. 12;

FIG. 14 is an exploded perspective view of a wall mount air filter structure embodiment of the air filter means of this invention;

FIG. 15 illustrates the wall mount air filter structure of the air filter means of this invention as mounted flush against a wall surface; and FIG. 16 is an electrical schematic of the control means of the wall mount air filter structure of this invention.

Figure 1:
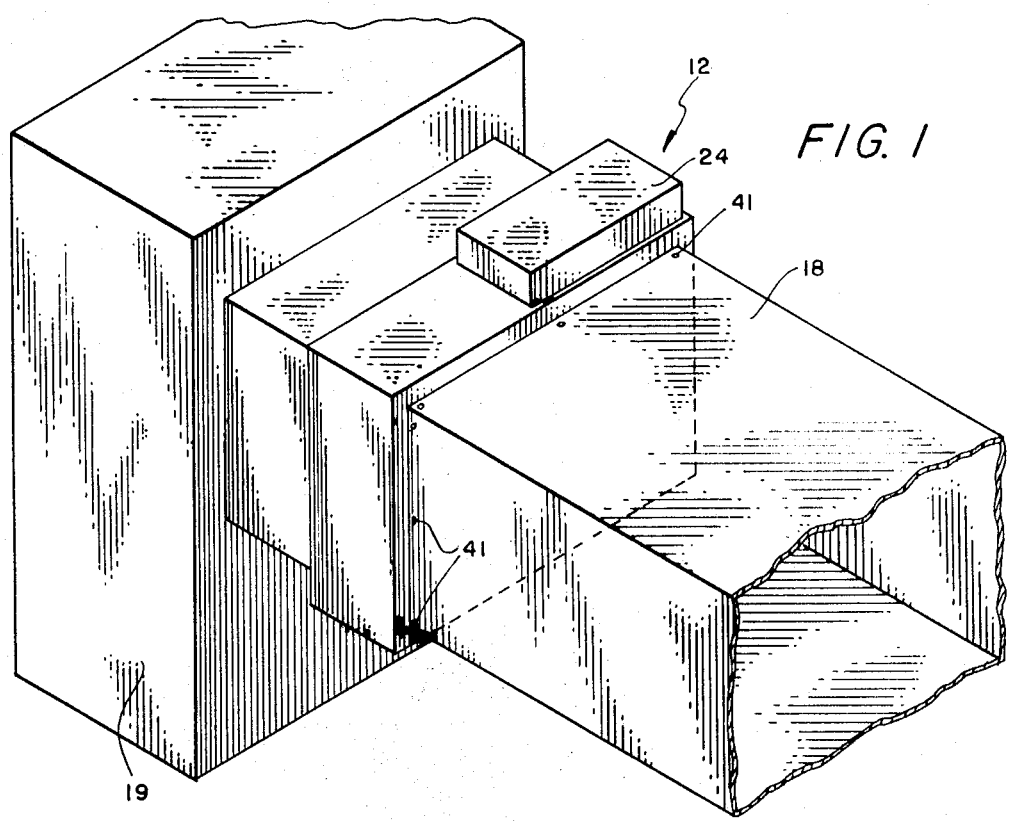
FIG. 1 is a perspective view of a duct mount air filter structure of the electronic air filter means of this invention as mounted within the return air duct of a furnace system.

The following is a discussion and description of preferred specific embodiments of the electronic air filtering means of this invention, such being made with reference to the drawings, whereupon the same reference numerals are used to indicate the same or similar parts and/or structure. It is to be understood that such discussion and description is not to unduly limit the scope of the invention.

The improved electronic air filter means of this invention includes three primary embodiments, namely (1) a duct mount air filter structure 12, (2) a duct mount compact air filter structure 14; and (3) a wall mount air filter structure 16. As shown in FIG. 1, the duct mount air filter structure 12 and the duct mount compact air filter structure 14 are readily mountable within a return air duct 18 in a furnace system. The air filter structure 12 receives air flow therethrough to the furnace structure itself indicated at 19. It is to be understood that the air filter means of this invention may be constructed of various heights and widths so as to be readily mountable within existing air duct systems and being readily accessible for repair and maintenance.

Referring to the drawings in detail and in particular to FIGS. 1-5, inclusive, the duct mount air filter structure 12 includes a main housing means 20; an electrostatic precipitator means 22 mounted within the housing means 20; and a control means 24 mounted upon the housing means 20 operably connected to a power source through an electrical conductor 26 and additionally connected to the electrostatic precipitator means 22.

The housing means 20 includes a main bottom wall 28; upright side walls 30 and 31 and an end wall 33 integrally connected to each other and to the bottom wall 28; a top wall 35 integrally interconnecting the upper edges of the side walls 30, 31 and the end wall 33; and an access end wall 36. The side walls 30 and 31 are provided with an air inlet opening 37 and an air discharge opening 38, respectively, with such openings taking substantially the entire area of the respective side walls 30 and 31. Each of the openings 37 and 38 are provided with a laterally extended flange 40 thereabout so that the same is readily connected to the air return duct 18 through screw members 41 when installed as shown in FIG. 1. The access end wall 36 is provided with a large access opening 43 which may be closed through the use of an access panel 45. On enclosing the access opening 43, the access panel 45 is secured to the end wall 36 by lock screw members 47. The access panel 45 is provided with an insulation covering 48 on the inner surface so as to assure non-conduction with the electrostatic precipitator means 22. The top wall 35 and bottom wall 28 are provided with parallel guide tracks and rails therein to receive the electrostatic precipitator means 22 as will be explained.

The electrostatic precipitator means 22 includes a pre-filter assembly 50; an ionizer assembly 52; a particle collector means 54; and an after-filter agglomerator assembly 55. The pre-filter assembly 50 includes a pair of filter panel members 56 interconnected at one edge by hinge members 57 so as to be foldable into a compact position which is desirable for removing and cleansing purposes. Each of the filter panel members 56 is constructed of a screen mesh material so that it can be readily washed and cleansed without damage. However, the mesh size is small enough to catch lint particles but having such large surface to keep the air pressure loss to a minimum. Additionally, it is obvious that the filter panel members 56 are mounted within a rectangular frame 58 and the filter material may be woven fiberglass, wool particles, etc. The pre-filter assembly 50 is adapted to be placed within U-shaped guide rail members 59 connected to respective upper aligned edges of the top wall 35 and the bottom wall 28.

The ionizer assembly 52 includes a pair of ionizer units 60 which are substantially identical and, therefore, only one need be described in detail. As shown in FIGS. 6 and 7, each ionizer unit 60 is provided with a support frame 61 having upright end posts 63 and 64 interconnected by parallel support members 65 of U-shaped in transverse cross-section. Intermediate of each pair of the support members 65 and 66 secured to insulation strips 67 mounted on the end posts 63 and 64 are elongated filament wires 69. In turn, the filament wires 69 have opposite ends secured to conductive tab members 71 mounted on the end posts 63 and 64 in an overlapping relationship to each other to form interconnected circuits on the outer surface of the end posts 63 and 64. The support frame 61 is releasably mountable in upper and lower brackets 73 in the top wall 35 and the bottom wall 28, respectively. The filament wires 69 are supplied with electrical energy transmitted through the tab members 71 when assembled as will be explained.

The particle collector means 54 includes a plurality, in this embodiment four particle collector units or cells 75 which are substantially identical and, therefore, only one need be described in detail. As shown in FIGS. 4, 8, 9 and 10, each collector unit or cell 75 consists of a first group of conductive electrodes in the form of parallel plates 76 in conjunction with a second group of electrodes being parallel plate members 78. These groups of plates 76 and plate members 78 are interleaved with the plate members 78 being somewhat shorter than the plates 76. All the plates 76 are secured together but insulated from adjacent ones by upright corner members 79. Central support posts 81 are interconnecting the plate members 78 with proper spacing from the plates 76 in the form of an insulated comb structure. The posts 81 are connected to upper and lower ones of the plates 76 by insulation members 83. The central ones of the plate members 78 are provided with laterally extended contact handles 84 so that electrical contact can be readily made in the assembled condition as will be explained. When the collector units 75 are mounted within the housing means 20, the plate members 78 are provided with electrical energy of high voltage and low amperage and the plates 76 are grounded to the housing means 20 and the charged foreign particles within the air flow therethrough are collected on the grounded plates 76 and repulsed by the charged plate members 78 thereby defining collecting zones between the plate members 78 and the plates 76.

The after-filter agglomerator assembly 55 includes four after-filter panel members 86, each of which are identical and therefore only one need be described in detail. Each after-filter panel member 86 is constructed of a synthetic fiber material adapted to provide a final filtering structure that collects any particles that may have been released from the particle collector units 75 if these are not cleansed periodically. The after-filter panel members 86 operate as a safety device which prevents the clogging of the cooling coil and heating elements of the furnace system.

The after-filter agglomerator assembly 55 further includes upper and lower guide tracks 87 secured to the top wall 35 and the bottom wall 28, respectively, and T-shaped bracket members 89 secured to a mid-portion of the side walls 30 and 31. It is seen that the respective ones of the pre-filter panel members 86 are readily slidable within the guide tracks 87 and bracket members 89 so as to be movable to cover the entire air discharge opening 38 plus being easily removed for cleansing if required.

Figure 2:
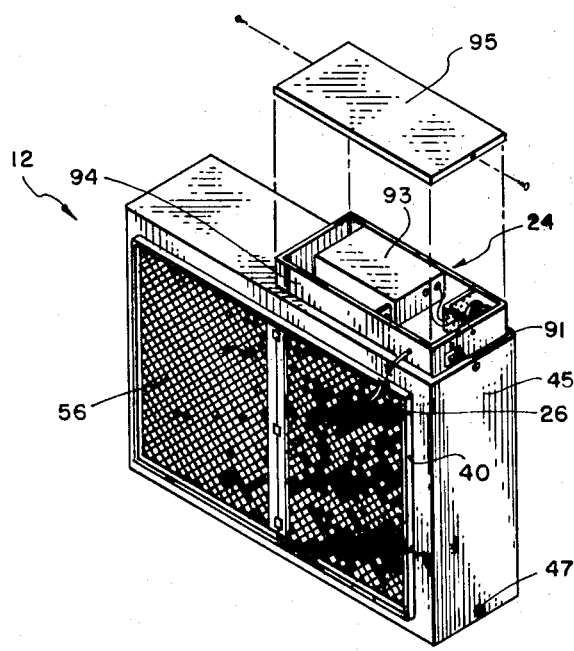
FIG. 2 is a perspective view of the duct mount air filter structure embodiment of this invention having an access lid to a control panel illustrated in exploded view.

In order to supply electrical energy to the electronic air filter structure 12, the electrical control means 24, illustrated in FIGS. 2 and 5, includes inlet conductor 26 connected to a standard 110-volt outlet circuit and being fed through an on-off switch 91 to a transformer 93. The control means 24 includes a control panel or box 94 mounted on the top wall 35 of the housing means 20 and having a removable lid member 95 thereon. There is also a safety switch 96 on the access panel 45 to de-energize all circuits on the same being opened. Another switch 97 connected to the conductor 26 is closed by the lid member 95 and is opened when the lid member 95 is raised thereby providing a safety feature to de-energize the control means 24 whenever the lid member 95 is opened. The housing means 20 is grounded and the transformer 93 operates to produce a 6,000 volt D.C. output with an amperage of approximately 2 ma. It is seen that this output is fed by a conductor 99 to the end wall 33 having a plurality of spaced contacts thereon. More particularly, two spaced spring loaded contacts 101 are connected to the conductor 99 in a particular relationship so as to be engagable with the plate members 78 of the respective collector units 75 when the same is pressed thereagainst through the contact handles 84.

The conductor 99 is also connected to a pair of spaced, leaf spring contacts 103 which are engagable with the ionizer units 60 when the same are placed within the housing means 20. The leaf spring contacts 203 are engagable with outwardly extended ones of the tab members 71 to provide the electrical energy therethrough to charge the filament wires 69 with the high voltage, low amperage current.

In the duct compact air filtering structure 14 as shown in FIGS. 11–13, inclusive, it is noted that the housing means 20 is provided having an electrostatic precipitator means 105 therein operably controlled by and connected to the control means 24 mounted upon the housing means 20. The housing means 20 is substantially identical to that previously described only differing in the height and width thereof to be usable in a smaller size of air return duct 18 in a furnace system. Also, it is obvious that the access panel 45 is adapted to cover the access opening 43 in the end wall 36 as previously described.

The electrostatic precipitator means 105 is provided with the pre-filter assembly 50; the ionizer assemblies 52; the particle collector means 54 and an after-filter agglomerator assembly 55. In this instance, the pre-filter assembly 50 includes three pre-filter panel members 56, each of which can be slidably mounted within the respective guide rails 73 in the housing means 20 and may be hinged at their adjoining edges for ease of removal and cleansing. The ionizer assembly 52 includes three of the ionizer units 60 constructed and operable as previously described.

The particle collector means 54 includes three of the particle collector units or cells 75 mounted within the housing means 20 but provided with the plate members 78 and plates 76 extended in parallel vertical planes. The after-filter agglomerator assembly 55 includes a plurality of the after-filter panel members 86 in this case, three, which are slidably mounted within the support tract 87 in a snug relationship adjacent the air discharge opening 38 in the side wall 31. As shown in FIG. 13, it is seen that the control means 24 is substantially identical to that previously described except having a plurality of switch members 107 provided with leaf spring members 108 to contact the laterally extended contact handles 84 on the particle collector units 75 for electrical continuity thereto. Additionally, switch members 109 are provided having leaf spring members 111 adapted to contact the inoizer units 60, respectively, for electrical continuity.

The wall mount air filter structure 16, as shown in FIG. 15, is readily mountable flush within an upright wall structure 112 when in the closed, usage condition. The wall mount air filter structure 16 includes a main housing means 114; an electrostatic precipitator means 116 mounted within the housing means 114; and a control panel means 118 detachably mounted within the housing means 114 and operably connected to the electrostatic precipitator means 116.

The housing means 114 includes a main rectangular support box structure 120 having an access door assembly 122 pivotally connected thereto. The box-like support structure 120 includes a back wall 124 interconnected to integral side walls 126, a bottom wall 127, a front wall 129, and a top wall 130. The back wall 124 has a large air discharge opening 132 to be placed in the air return duct of a furnace system. The outer edges of the side walls 126, the bottom wall 127, and the top wall 130 are provided with laterally extended flanges 134 adapted to be placed against and anchored to the support wall structure 112.

The access door assembly 122 is provided with parallel side walls 135 connected to a back wall 137 and a front wall assembly 138 having the lower surface of the front wall assembly 138 provided with a hinge member 141 so as to be pivotally connected to the support structure 120. The front wall assembly 138 is provided with a plurality of horizontally extended louver-type openings 143 to receive air therethrough similar to a conventional air return grate in the furnace system of today. The upper end of the access door assembly 122 is enclosed by a cover member 144 which is pivotally connected as by bolt members 145 thereto and movable from the open condition of FIG. 14 to a closed condition. The inner surface of the cover member 144 is provided with an insulated plate member 148 to provide the proper electrical continuity and insulation in the closed condition. The opposed inner surface of the end walls 135 are provided with a plurality of guide tracks 148 and guide rails 151, each adapted to receive respective ones of the electrostatic precipitator means 116 therein. Also, a chain member 153 is connected between the flanges 134 and the inner surface of the front wall assembly 138 so as to hold the same in open position shown in FIG. 14 whereupon one can readily remove the electrostatic precipitator means 116 therefrom for repair and maintenance.

The electrostatic precipitator means 116 includes the pre-filter assembly 50; the ionizer assembly 52; the particle collector means 54; and the after-filter agglomerator assembly 55. In this instance, the pre-filter assembly 50 includes a pair of the pre-filter panel members 56 which may be interconnected at adjacent edges for ease of cleansing and removing. The pre-filter panel members 56 are constructed as previously described and operable to filter the large particles of lint and the like moving through the system. The ionizer assembly 52 includes a pair of the ionizer panel members 60, substantially identical to those previously described.

The particle collector means 54 includes a pair of the particle collector units 75 adapted to be mounted in respective ones of the guide tracks 149 and are readily removable for repair and maintenance.

The agglomerator assembly 55 includes a pair of the agglomerator panel members 86, substantially identical to those previously described and operable to collect particles which may break loose from the collector units 75 if they are not periodically cleansed.

As shown in FIG. 14, the control means 118 includes a control panel or drawer member 156 readily connected by screw members 157 in the front wall 129. The drawer member 156 may be easily removed for repair and maintenance and operates identically as previously described. Additionally, the control means 118 includes a safety switch means 159 which is adapted to automatically disconnect the electrical circuit to the electrostatic precipitator means 116 on opening the access door assembly 122 for obvious safety reasons.

In the use and operation of the electrostatic air filter means of this invention, we first look at the duct mount air filter structure 12. On energizing the on-off switch member 91 and closing of the lid member 95 and the access panel 45, it is seen that the electrical circuit is provided to the adjacent interconnected ones of the ionizer units 60 and the particle collector means 75. It is seen that the electrical circuit means provides the high voltage, low amperage D. C. energy across the filament wires 69 to charge the foreign particles contained within the air moving through the air inlet opening 37 so that the particles are charged before moving into the respective collector units 75. Of course, any large particles within the air are collected upon the pre-filter assembly 50. The plates 76 and the plate members 78 are oppositely charged so that the charged particles within the air supply moving between the parallel plates 76 and the plate members 78 provide for (1) repelling the particles by the positive charged plate member 78, and (2) the grounded plates 76 attract the same thereby providing for removal of the particles in the air and the collection thereon. It is obvious that after a certain period of time, the collector units 75 become in need of maintenance as the plates become covered with nicotine, oils, resins, tars, and the like and most be removed for cleansing purposes. On removing the access panel 45, the modular electrostatic precipitator means 22 is de-energized and removable for cleansing purposes. More particularly, the collector units 75 most frequently require cleansing and can be readily removed on grasping the contact handles 84 and pulling each unit 75 from the housing means 20. It is obvious that the pre-filter panel members 56 and the agglomeration filter panel members 86 can be removed for cleansing as required as well as the ionizer units 60 and placed in a conventional household dishwasher for cleansing. Also the collector units 75 are of lightweight and can be readily removed as by a housewife for cleansing purposes and reassembled in an easy manner resulting in its operation in a highly efficient manner at all times.

In the use and operation of the duct mount compact air filtering structure 14, it is seen that the same operates substantially identical to the previously described air filter structure 12 but having the particle collector units 75 (plate members 78 and plates 76) and the ionizer assembly 52 (filament wires 69) extended in upright vertical planes while providing for the same efficient and effective air filtering operation with these elements readily removed from the housing means 20 for repair and maintenance.

In the use and operation of the wall mount air filter structure 16, the housing means 114 may be readily mounted in a conventional plasterboard and beam structure whereupon a given area is removed to receive the support structure 112 therein secured as by screw members thereto. The air discharge opening 132 is connected to an air return duct so that air is directed inwardly through the access door assembly 138 to the furnace system. It is obvious that the access door assembly 138 may be pivoted to the open condition of FIG. 14 and held by the chain member 153 whereupon the cover member 144 may be opened. Thereupon, it is obvious that the various elements of the electrostatic precipitator means 116 are readily removed for cleansing and maintenance checks. It is also obvious that the safety switch member 159 operates to disconnect all the electrical circuits for safety purposes.

It is seen that the electrostatic air filter means of this invention provides a compact structure easily mountable and operable to efficiently and effectively remove particles from air within a given area by electrostatic means. It is obvious that the electrostatic air filter structures of this invention are economical to operate, highly efficient in filtering use, and relatively inexpensive to manufacture, making the same economically feasible for home usage.

As will be apparent from the foregoing description of preferred specific embodiments of the applicant's air filter means, relative simple and inexpensive means have been provided which may be mountable in a desired area so as to provide an efficient low cost means of automatically and effectively filtering impurities from the air. Applicant's device eliminates a great deal of time consuming, tedious, and expensive service work as the filtering units can be readily cleansed in conventional dishwashers.

While the invention has been described in conjunction with preferred specific embodiments thereof, it will be understood that the description is intended to illustrate the invention, which is defined by the following claims:

1. An electronic air filter structure to be secured in an air return duct in a furnace system, comprising:
    (a) a housing means having an air opening therein of a size equal to the air return duct so as to not restrict air flow therethrough, an access means connected to said housing means and movable from opened to closed conditions,
    (b) an electrostatic precipitator means mounted within said housing means, each said electrostatic precipitator means having adjacent ones of said openings an ionizer unit and a particle collector unit,
    (c) said ionizer units having a plurality of filament members extended across said air openings within said housing means,
    (d) said collector units including a plurality of plate members having adjacent ones separated by second grounded plates defining collecting zones, said plate members and said second grounded plates extended substantially parallel to each other and substantially transversely across said air opening, (e) a control means having a contact member engaged with said ionizer units and supplying electrical power thereto, a second contact member engaged with said plate members and supplying electrical power thereto, and an electrical circuit means connecting said contact member and said second contact member of each electrostatic precipitator means to a high voltage direct current power supply, (f) said access means having an insulated panel member to hold said ionizer units and said collector units therein and movable to a released condition for removing same, (g) said ionizer units movable within upper and lower brackets secured to said housing means, (h) said electrostatic precipitator means further including a pre-filter assembly and an after-filter agglomerator assembly, and (i) said pre-filter assembly including a pair of filter panel members connected at one edge by a hinge member, each of said filter panel members constructed of a screen mesh material and movable within U-shaped guide rails secured to said housing means.

2. An electronic air filter structure as described in claim 1, wherein:

(a) said precipitator means having four of said collector units, each of said collector units having outwardly extended contact handles to achieve electrical continuity between adjacent ones thereof and said second contact member, (b) said electrostatic precipitator having two of said ionizer units having said filament members, said plates, and said plate members extended in parallel planes, and (c) said after-filter agglomerator assembly having four after-filter panel members constructed of a synthetic fiber material to prevent movement of any particles therefrom, and upper and lower guide tracks secured to said housing means to slidably receive said after-filter panel members therein.

3. An electronic air filter structure as described in claim 1, wherein:

said control means including spaced spring loaded contacts engagable with said collector units and leaf spring contacts engagable with laterally extended tabs secured to said ionizer units.

References Cited

UNITED STATES PATENTS

| | | | |
|---|---|---|---|
| 2,233,639 | 3/1941 | Pegg | 55—139 X |
| 2,502,560 | 4/1950 | Dahlman | 55—139 X |
| 2,873,000 | 2/1959 | Elam | 55—139 X |
| 2,925,881 | 2/1960 | Berly et al. | 55—145 |
| 2,979,158 | 4/1961 | Vlier, Jr | 55—139 |
| 3,028,715 | 4/1962 | Nodolf | 55—138 |
| 3,041,807 | 7/1962 | Getzin et al. | 55—143 |
| 3,191,362 | 6/1965 | Bourgeois | 55—139 X |
| 3,222,848 | 12/1965 | Koble, Jr. | 55—139 X |
| 3,237,383 | 3/1966 | Gilbertson | 55—139 |
| 3,438,180 | 4/1969 | Klouda | 55—139 X |
| 3,504,482 | 4/1970 | Goettl | 55—139 |
| 3,513,634 | 5/1970 | Angonese et al. | 55—139 |

FOREIGN PATENTS

| | | | |
|---|---|---|---|
| 931,625 | 7/1963 | Great Britain | 55—139 |

OTHER REFERENCES

Metal-Fab reference, "Model C4A Electronic Air Cleaner," Metal-Fab, P.O. Box 1138, 725 E. 37th St., North Wichita, Kans., 2 pages, received in the Patent Office, Oct. 9, 1968.

DENNIS E. TALBERT, JR., Primary Examiner

U.S. Cl. X.R.

55—135, 138, 139, 143, 145 146, 149, 151, 154, 282, 318, 481, 483, 484, 485, 493, 511, 527